United States Patent
Paulus et al.

(10) Patent No.: US 8,617,446 B2
(45) Date of Patent: Dec. 31, 2013

(54) METHOD AND DEVICE FOR PRODUCING PLASTIC MOLDED SKINS HAVING DIFFERENT SUBREGIONS

(75) Inventors: Jakob Paulus, Neustadt (DE); Ingolf Dreger, Abensberg (DE)

(73) Assignee: Peguform GmbH, Bötzingen (DE)

( * ) Notice: Subject to any disclaimer, the term of this patent is extended or adjusted under 35 U.S.C. 154(b) by 206 days.

(21) Appl. No.: 12/843,611

(22) Filed: Jul. 26, 2010

(65) Prior Publication Data
US 2012/0025415 A1  Feb. 2, 2012

Related U.S. Application Data
(63) Continuation of application No. PCT/EP2008/008687, filed on Oct. 15, 2008.

(30) Foreign Application Priority Data
Feb. 21, 2008  (EP) .................................... 08003169

(51) Int. Cl.
*B28B 5/02*  (2006.01)
(52) U.S. Cl.
USPC ........... 264/294; 264/255; 264/299; 264/309; 264/254; 264/302; 425/425; 425/435; 249/112
(58) Field of Classification Search
USPC ......... 264/255, 294, 299, 309, 310, 254, 319, 264/331.19, 331.5, 302; 425/112, 182, 425, 425/435; 249/102, 112
See application file for complete search history.

(56) References Cited

U.S. PATENT DOCUMENTS

| | | | |
|---|---|---|---|
| 5,667,192 A * | 9/1997 | Van Doren | 249/82 |
| 6,071,619 A * | 6/2000 | De Winter | 428/423.1 |
| 2002/0164395 A1 * | 11/2002 | Yoshinaga et al. | 425/589 |

FOREIGN PATENT DOCUMENTS

| | | | | |
|---|---|---|---|---|
| DE | 38 26 354 A1 | 2/1990 | | |
| DE | 10 2005 020 492 A1 | 11/2006 | | |
| DE | 10 2005 020 493 A1 | 11/2006 | | |
| EP | 972 625 A1 | 1/2000 | | |
| GB | 968760 | * | 8/1962 | |
| JP | 10235675 A | * | 9/1998 | B29C 45/02 |
| WO | WO 95/32850 A | 12/1995 | | |
| WO | WO 2007/071207 A | 6/2007 | | |

* cited by examiner

*Primary Examiner* — Yogendra Gupta
*Assistant Examiner* — Ninh Le
(74) *Attorney, Agent, or Firm* — Law Firm Ursula B. Day

(57) ABSTRACT

The present invention relates to a method and a device for producing plastic molded skins having different subregions. For this purpose, before melting the first plastic material, a region of the molding tool surface (2) is covered with a separate energy self-sufficient mask (3). After the unmasked region of the molded tool surface (2) has been coated, the mask (3) is removed, and in a second manufacturing step the exposed subregions of the molding tool surface (2) is coated with a different plastic material, the two subregions of the plastic skin bonding with each other.

6 Claims, 3 Drawing Sheets

METHOD AND DEVICE FOR PRODUCING PLASTIC MOLDED SKINS HAVING DIFFERENT SUBREGIONS

CROSS-REFERENCES TO RELATED APPLICATIONS

This application is a continuation of the International Application No. PCT/EP20081008687, filed Oct. 15, 2008, which designated the United States and has been published as International Publication No. WO 2009/103320 and which claims the priority of German Patent Application, Serial No. 08003169.3, filed Feb. 21, 2008, pursuant to 35 U.S.C. 120.

BACKGROUND OF THE INVENTION

The present invention refers to a method for the production of plastic molded skins having different subregions, as well as a device for the production of such plastic molded skins. The afore-stated plastic molded skins are provided especially for use in interior paneling and instrument dashboards of motor vehicles and include subregions having varying properties, in particular, having different colors.

Methods for the production of multicolored plastic molded skins are known since some time now.

Thus, for example EP 0 972 625 A1 describes a device for rotation sintering of plastic molded skins for the production of instrument dashboards or interior paneling of motor vehicles and are comprised essentially of a heatable mold tool as well as two differently equipped container fitting with the mold tool and containing plastic powder, wherein the containers are utilized sequentially in two different work steps each in combination with the mold tool. The first plastic powder container includes a bowl-shaped projection which extends into the interior of the mold tool covering a portion of the surface of the mold tool. This powder container is utilized with a first plastic powder in a first work step, wherein the first powder is melted at the exposed surface of the warmed mold tool, while the area underneath the bowl-shaped cover of the mold tool remains free of powder.

In the second work step a second powder box is utilized, which contains a differently colored powder and does not include a suitable projection for a cover, such that during the repeated rotation sintering, the second powder melts at the area of the surface of the mold tool previously maintained exposed and there, forms a molded skin in a different color, which combines with the molded skin of the first molded skin to form a multicolored molded skin.

The problem with the device is the high operative expenditure, in particular also for the sealing of the cover (mask), where, especially in complicated molds, there is the danger of leakage and where blurring of the color borders can take place.

In DE 10 2005 020 492 A1 and in DE 10 2005 020 493 A1 a device or a method for the production of multicolored plastic molded skins are described, in particular for motor vehicle parts, such as for example instrument dash boards or door paneling, wherein the plastic molded skins are built by the sintering method through means of sequential multiple continuous melting of plastic powders of different colors at the surface of a heated mold tool. The areas to be provided with plastic powders of different colors at a surface of the mold tool are separated from each other by projections or webs. The covering or mask which in this case is also integrated into the powder container is, at its edges, provided with a gasket that is supported by the webs. In addition, an above atmospheric pressure is produced in the covered surface areas bordered by the webs. In this manner, the problem of the exact color separation is solved, however, in this case also, there is a relatively high expenditure in apparatus required, in particular, in order to integrate the mask as well as the required energy supply for the locking and sealing of the mask at the mold tool surface, as well as the production of the above atmospheric pressure in the masked area integrated in a corresponding powder box.

As an additional problem there is the fact that such masked powder containers, or those provided with covers or similar mold tool counter parts are provided with a series of additional cables and tubes in order to realize the functional capability of the mask. These cable and tubes packets render the manufacturing process undesirably complex and thereby causing considerable spatial restrictions.

Thus, the problem remained to realize a masking technique for the production of plastic molded skins with subregions of different properties, in particular, areas having different coloring, that do not exhibit the drawbacks of the prior art.

The problem is solved by a method for the production of subregions having different properties, in particular, molded plastic skins having different colors, by depositing sequentially different plastic materials onto a surface of a heated mold tool, wherein a) prior to depositing the first plastic material at least one area of the surface is covered,
b) which at least seals at least a masked area between mask edge and mold tool surface,
c) in a first forming step a first molded skin is formed at the exposed surface of the mold tool,
d) the forming process is subsequently interrupted and the at least one mask is being removed and
e) at the exposed area of surface of mold tool, with a second different plastic material a second molded skin is being formed in a second forming step, wherein the plastic molded skins are bonded to a single molded skin having subregions with different properties, wherein the at least one mask is arranged as a separate energy self-sufficient mask at the surface of the mold tool. The problem is further solved by a device for the production of areas having different properties, in particular, different colors that includes a) a heatable mold tool for forming of plastic molded skins by depositing plastic material onto a surface of a heated mold tool and
b) at least one mask for covering an area of the surface of a mold tool before the deposit of the first, plastic, wherein the mold tool at its surface has means for receiving at least one mask and the at least one mask is configured as a separate energy self-sufficient mask with corresponding means for building up a bond with the mold tool surface. Further advantageous embodiments of the method as well as the device are reflected in the respective dependent claims.

The essential idea of the invention is such that a separate mask is provided for a subregion of the mold tool surface which is energy self sufficient and can be by itself directly connected to the mold tool or the mold tool surface that is no longer combined with the mold tool counter part. For that, the surface of the mold tool or the mask must at first be provided with means for fixing and centering the mask at the surface of the mold tool. At the same time, the mask itself has to be provided with means which supply energy for the action of locking and unlocking the mask at the mold tool surface, as well as the sealing of the mask edge at the mold tool surface. Under such conditions, one or more subregions of the mold tool surface can be then covered with at least one separate mask and be left free of powders.

In an advantageous embodiment of the present invention, the mask is centrally locked via a locking bolt by means of a locking bushing disposed at the surface of the mold tool. The exact location of the mask is fixed through additional centering pins. For that, an additional centering pin is, for example, disposed at the mold tool surface which engages into a corresponding centering bushing in the mask. In an advantageous embodiment of the present invention, several (at least two) centering pins or centering domes are provided for realizing a fitted arrangement of the mask at the surface of the mold tool.

The afore-described means for fixing and centering the mask at the mold tool surface, or their corresponding counterparts can be mutually disposed either at the mold tool surface or in the mask itself. That is, reversed arrangements are also possible, where the centering pin is integrated into the mask, while the locking bolt is arranged at the mold tool surface, or both bolt and pin can be arranged at one side and the corresponding bushings then at each opposite side.

An advantageous embodiment of the present invention provides that the mold tool is a galvanically produced mold tool, which exhibits a galvanically integrated locking bushing made from steel. The locking of the mask at the surface of the mold tool is advantageously carried out via a locking bolt with spring-loaded pressure balls disposed therein and for realizing the locking action in a simple manner analog the coupling of a trailer. The unlocking of the mask in this case, is carried out by releasing the pretensioned pressure balls by means of a pressure container or pressure cylinder in the interior of the mask.

The first step of the method according to the invention is to fix the mask at the surface of the mold tool. After the mask has been locked and centered at the surface of the mold tool, the masked area at the lower edge of the mask is being sealed against the surface of the mold tool, wherein as an advantageous embodiment of the present invention, a sealing edge is provided at the mask with seals of durable elastic and temperature resistant plastic. An advantageous embodiment of the invention provides that these seals are inflated by means of a pressure container or pressure cylinder disposed in the interior of the mask. After sealing the masked area, a first molded skin can be formed in the uncovered areas of the mold tool surface.

The formation of the molded skin is carried out preferably via rotation sintering or spray sintering.

When carrying out rotation sintering, the mold tool, preferably a so-called "galvano" is closed with plastic powder container as a lower mold counter part and the plastic molded skin is discharged at the heated mold tool surface during rotation of the closed mold.

So that no powder reaches the masked area, the masked area is being sealed. Fort his purpose, seals are provided in the marginal area of the mask that are made from a relatively hard, and heat-resistant material having tensile strength, such as for example, polyurethane or silicon caoutchouc. In order to realize complete sealing of the mask, ductile or inflatable seals are utilized. In an advantageous embodiment, it is contemplated that the inflation of the seals is initiated by means of a timer element integrated into the interior of the mask and in operative contact with a pressure container, and wherein the seal is being inflated only shortly prior to the actual slush-process which is the melting of the plastic. This has the enormous advantage that the seals come in contact only very late with the hot surface of the mold tool and the contact time between seal and mold tool surface is kept as short as possible, which markedly extends the lifetime of the seals.

Advantageous variants which offer themselves for this method for the inflatable seals are two different seal types, both from permanent elastic and thermally stable plastic, such as for example polyurethane or silicon caoutchouc. With the first seal type, a groove is formed in the lower edge of the mask, in which a hinge-type constructed rubber seal is clamped. When inflating the seal the hinges unfold and the rubber seal moves out from the groove and adjoins tightly at the surface of the mold tool.

The second seal type is a seal ring disposed at the mask edge and the sealing results from the inflation and the corresponding expansion of the seal ring.

After a first molded skin with defined properties has been formed via the first work step, the mold tool is opened again and at least one masked subregion is exposed after removal of the mask. In a second work step, in which the plastic powder is changed, a different plastic powder is then deposited on this subregion. Since the "galvano" is evenly heated in all areas for discharging the second plastic layer, at the same time, a connective bonding takes place between the two plastic molded skins into a single plastic molded skin having different properties. This presupposes that the plastic materials involved are at least related polymers with similar melting points that can be melted together. The plastic molded skin so obtained, subsequently can be further handled in the usual manner into an interior paneling or instrument dashboard for a motor vehicle.

Originally, the mask technique was used in particular, for the production of multicolored plastic molded skins. For this purpose, the same basic plastic is usually utilized for both color areas where the powder mixtures differ only by the different dye stuff components. The method according to the present invention is however not limited to the production of different color subregions, but can also be utilized in order to obtain molded skins with subregions of different haptik or having other, different physical properties. These variations can be obtained in that each of the powders contain different additives or that different co-polymerisates are utilized in powder form, which might tie in with the base polymer such that they have a comparable melting point, but differ in each of the copolymers. Of course, chemically very different thermoplastic plastic material can also be utilized, if they exhibit a similar melting point and can bond with each other or are melting with each other.

The method of the present invention is not limited to plastic skins having two different subregions, several independent masks at the mold tool surface with several different subregions can also be arranged, whereby either in successive work steps or all in one work step being removed at the same time, and further plastic layers discharged onto the exposed areas of the mold tool surface that then bond to a single plastic molded skin with several different subregions. In this manner, it is possible to produce molded skins having different subregions in several work steps utilizing different plastic powders.

The special advantage of the present invention is based on each mask being arranged as an energy self-sufficient mask directly at the surface of the mold tool and thus without the need for further cables, tubes or lines in the outer area of the mold. In particular, with the slush-method (rotation sintering), additional cable or hoses in the outer area of the mold means a noticeable complication of the method and a spatial restriction, where the arrangement of the cables and tubes outside of the mold have to be synchronized to the motions of the mold and at the same time when the mold is open, free access to the interior of the mold is always needed, which in view of the multiple supply lines is not easily realized.

Through the introduction of an energy self-sufficient mask configured as a volume dimensioned body and interiorly is provided with pressure cylinders or pressure containers by which the locking and the sealing of the masks can be controlled, these problems disappear, such that the entire production of the molded skins can be controlled fully automatically via a robot and, for example, the mask, with the aid of a robot disposed at the surface of the mold tool, can be centered and locked and subsequently forming the molded skin for the first subregion at the exposed areas of the surface of the mold tool; after this work step the mold tool is again opened and the mask can be removed per robot and cleaned outside of the area of the mold tool, and wherein at the same time, the pressure container integrated into he mask can again be refilled.

The sealing and locking of the mask is controlled by control units within the mask, and the control steps integrated into the entire production process and also adjusted thereto, such that, for example, locking of the mask is carried out during deposit onto the mold tool surface by means of the robot, while the sealing is initiated only shortly before the slush-process. The unlocking takes place again in the coordination with the robot.

A further advantage of the method according to the invention is that the mask as a single piece can be cleaned in a more easy and uncomplicated manner than a mask or cover which is integrated into the powder container or into another counter part of the mold tool.

As already seen from the foregoing description, the masking technique according to the present invention is especially and advantageously suited for rotation sintering but can be utilized also for the spray sintering or any other technique of molding processes where thermoplastic plastic material is processed and the surface areas of the mold tool are to be masked in order to at first prevent formation of a material layer at these sites but where deposits in these areas are then also made in a subsequent step.

Especially suitable plastic materials for the afore-described method according to the invention are polyvinyl chloride (PVC), or thermoplastic polyurethane (TPU) or also co-polymerisates on the basis of PVC or polyurethane.

In the following paragraphs the method according to the present invention will be more readily explained by the following Figures. It is shown in:

DETAILED DESCRIPTION OF PREFERRED EMBODIMENTS

Figure 1:
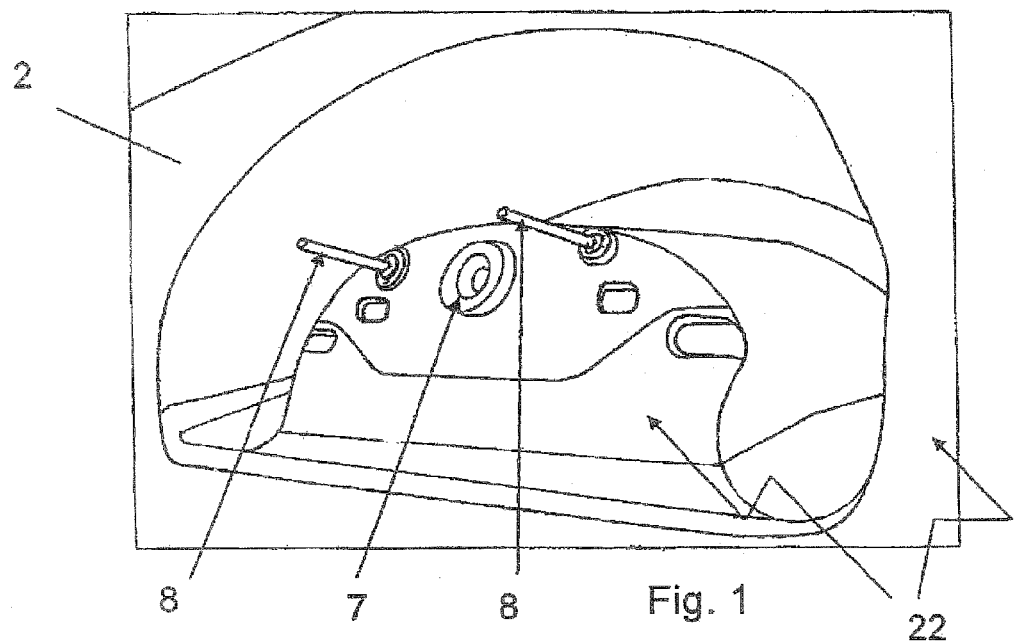
FIG. 1 a perspective view of a detail of a mold tool (galvano)

FIG. 1 shows a detail of the mold tool 1 for the slush-process (rotation sintering). The detail shows a Galvanos 22 for the production of instrument panels where the detail selected for FIG. 1 is provided for the formation of the so-called scoop at the area of the steering wheel. At the surface 2 of the Galvanos 22, a galvanized lock bushing 7 is seen, as well as two centering pins 8 which project from the surface of the Galvanos 22. The centering pin 8 and the lock bushing 7 are arranged at an area of the Galvanos 22 which has a minor role in the formation of the molded skin since the corresponding area of the molded skin in a further work step is being punched out as an opening for the instrument indicator.

Figure 2:
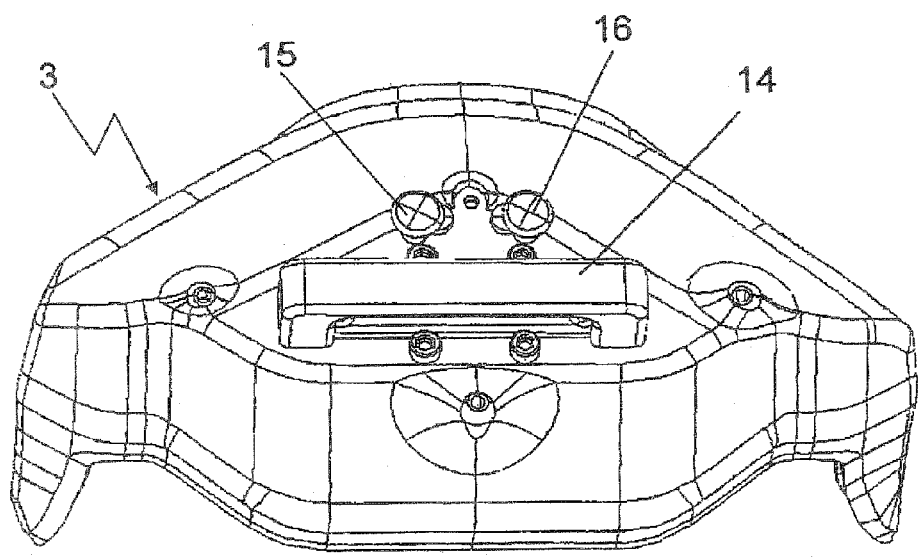
FIG. 2 a perspective exterior view of a mask for the device according to the present invention.

FIG. 2 shows an exterior view of a mask 3 for the method according to the present invention. Mask 3 is configured as a body having a volume with a handle 14 at its exterior side and two control knobs 15 and 16 which are provided for manual locking and unlocking or sealing of the mask.

Figure 3:
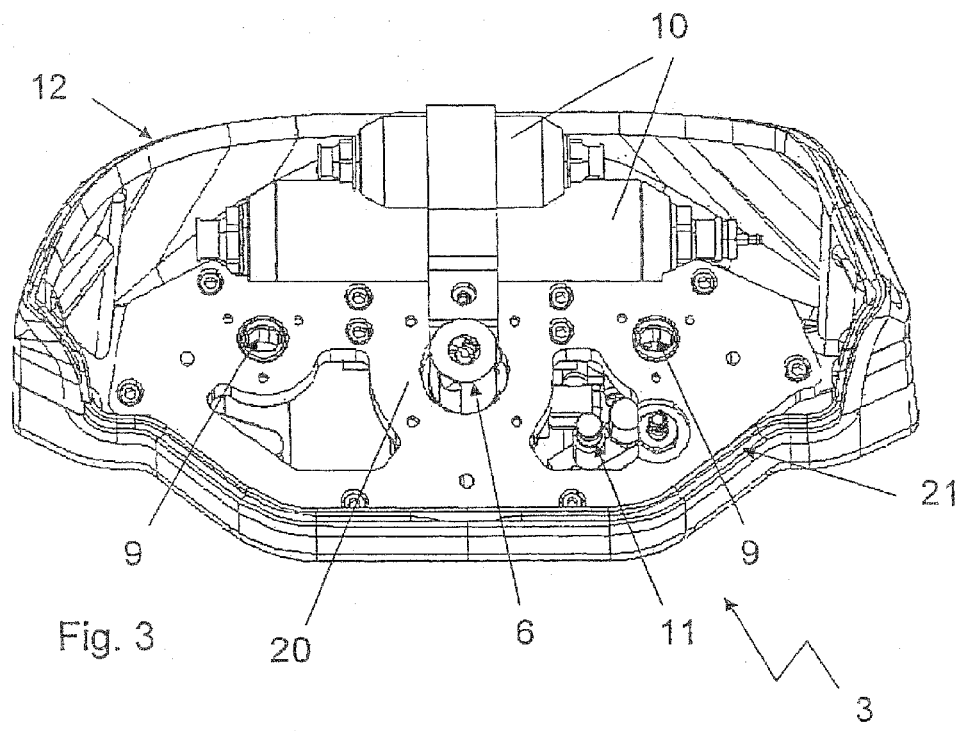
FIG. 3 a perspective view of the interior of a mask.

FIG. 3 shows the interior view of a mask 3 with an integrated support 20, at which most of the functional elements of the mask 3 are arranged. At the center of the support 20, the centering pin is shown while in the periphery of the support 20 receiving bushings 9 for centering pin 8 are shown. In the interior of the mask, two pressure cylinders 10 are seen in addition as essential elements, of which one container 10 for the control of the locking or unlocking action is provided, while the second container 10 supplies the compressed air for the inflation of the seals 13. The edge of the mask is configured as a sealing edge 12, which normally is provided with an inflatable seal 13 and disposed in the groove 21, however, the seal 13 is not shown in this figure.

Figure 4:
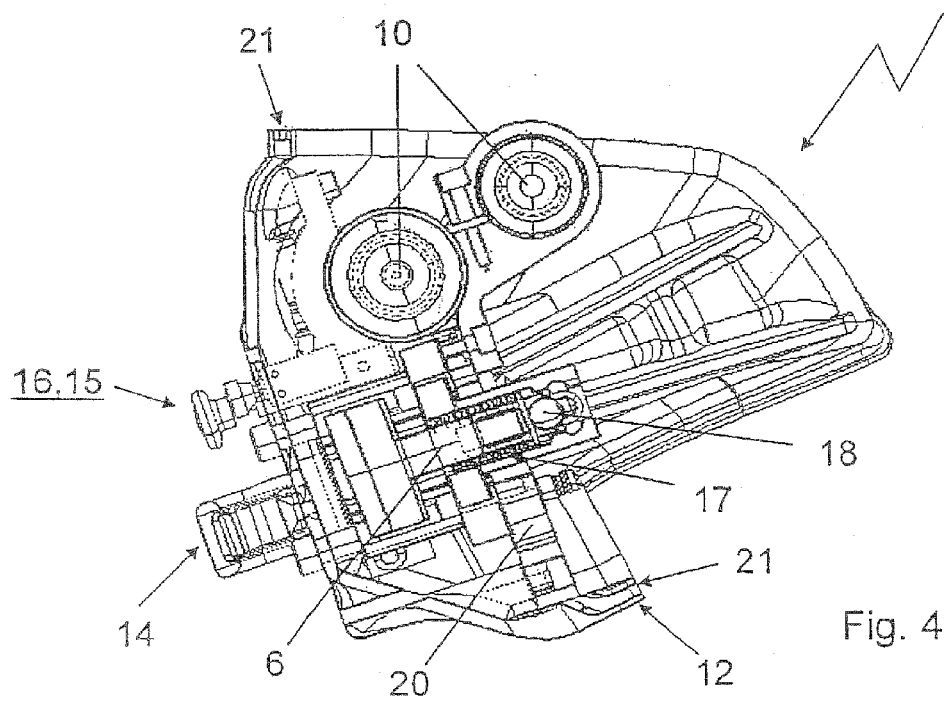
FIG. 4 a cross section of a mask.

FIG. 4 shows a mask 3 in cross section. This view shows that the arrangement of the single functions within the mask is relatively compact, since naturally, for this arrangement only as much room is supplied such as also provided later on in the corresponding cavity of the mold tool 1. In FIG. 4, the mask 3 shown there, the central functional elements, the pressure cylinder 10 and the locking bolt 6 are shown. The larger of the two pressure cylinders 10 is provided for the locking and unlocking action of the mask and for that reason is located in the possibly closest position to locking bolt 6. The second pressure cylinder 10 with a somewhat smaller diameter is provided next to the larger compressed air container 10 and fixed by means of a clamp-type holding device for the supply of compressed air to inflate the seals 13. Integrated into the locking bolt 6 is a spring 17 by means of which the pressure balls 18 are pretensioned for locking of mask 3. The mask edge is configured as sealing edge 12 and includes a groove 21 for receiving the inflatable seal 13. The handle 14 as well as the knobs 15, 16 for unlocking or locking of mask 3 or the seal, are arranged exterior of mask 3. The functional elements are provided for the manual operation of mask 3 and are not ultimately necessary for the fully automated operation of the method or the device according to the present invention. However, for the fully automated use of mask 3, in any event, at least the possibility for an intervention in connection with unlocking mask 3 must be provided at the exterior of the mask 3, so that in case of an operational problem, mask 3 can be removed from the surface of the mold tool if necessary.

Figure 5:
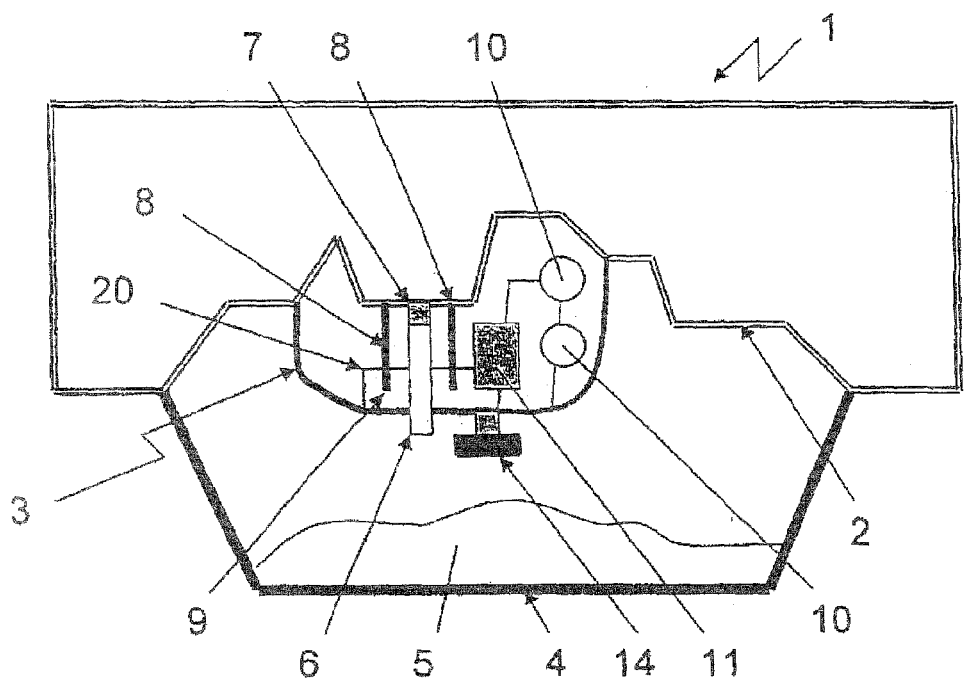
FIG. 5 a schematic representation of a device for rotation sintering according to the present invention.

FIG. 5 shows a schematic assembly of a rotation sintering unit in cross section. This rotation sintering unit comprises a device according to the present invention for the production of a molded skin having different subregions with a mold tool 1 and a mask 3 as well as a powder container 4. An area of the mold tool surface 2 is covered with a mask 3 which is fixed via a locking bolt 6 in a locking bushing 7 at the mold tool surface 2.

Mask 3 is centered by means of two additional centering bolts 8 which engage with centering bushings 9 in support 20. At the support 20, a timer element 11 as an additional functional element, as well as two pressure cylinders 10 are provided. In addition, mask 3 is provided with a handle 14 for the manual operation of mask 3. The powder container 4 covers the to be coated mold tool surface 2 and is charged with a plastic powder. During rotation of the rotation sintering unit, the plastic powder falls onto the heated surface of the mold tool 2 and is discharged as a molded skin. The area that is covered by mask 3 remains at first free of plastic powder. In the second work step, the mask 3 is removed while the molded skin that has already been discharged remains on the surface of the mold tool 2. The powder container 4 is now charged with a different plastic powder 5 and in the next rotation sintering step, the free area of the mold tool surface 2 is now also being coated with a plastic 5. The second plastic 5, while having different properties than the first plastic is related to the first plastic to the extent that it can bond together with it to form a single molded skin having different areas.

Figures 6A, 6B:
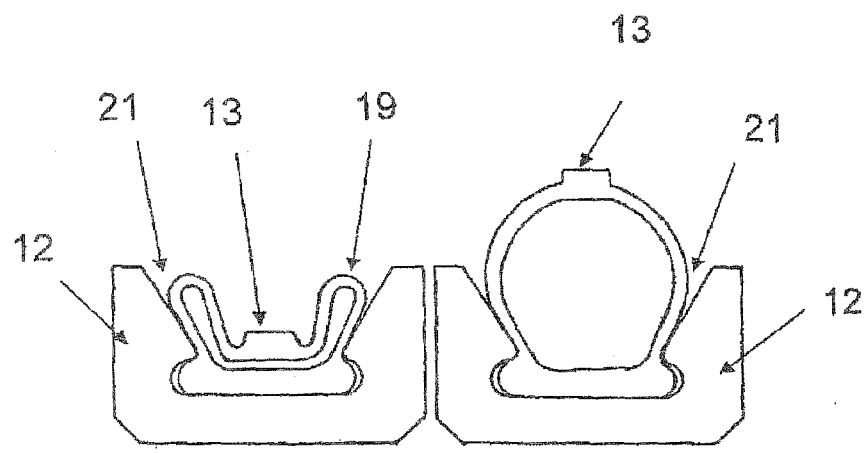
FIGS. 6a and b the cross section of an inflatable seal in resting position and in inflated position.

FIGS. 6a and 6b show a preferred embodiment of the sealing edge 12 of mask 3. The sealing edge 12 is provided with a groove 21 into which the seal 13 is inserted, such that a kind of swallowtail is formed between seal 13 and groove 21. Upon inflation, the seal 13 unfolds through hinges 19 and forms a tire-shaped seal 13 which tightly abuts the surface 2 of the mold tool 1.

What is claimed is:

1. A method for production of subregions having different properties in molded plastic skins comprising the following steps:

placing a mask on an area of a mold tool, said mask being configured as a separate energy self-sufficient mask; an interior space of the mask includes a support, pressure cylinders, a locking bolt having spring-loaded pressure balls disposed therein, and a centering bushing; wherein an edge of the mask is configured as a sealing edge provided with an inflatable seal, wherein part of the sealing edge is in a plane which is different from a plane of the centering bushing;

centrally locking the mask in place with the locking bolt and a locking bushing, centering the mask with a centering pin that engages the centering bushing, wherein the locking action is effected via the spring-loaded pressure balls;

sealing the masked area between the mask and the mold tool surface by inflating the seal with compressed air from one of the pressure cylinders, in a first forming step, depositing a first plastic material at an exposed surface area of the mold tool thereby forming a first molded skin, subsequently interrupting the forming process, unlocking the mask by releasing the spring-loaded pressure balls via the other pressure cylinder, and removing the mask, at a second surface area of the mold tool, depositing a second plastic material which is different from the first plastic material thereby forming a second molded skin in a second forming step, wherein the first and second plastic molded skins are bonding to a single molded skin having subregions with different properties.

2. The method according to claim 1, wherein the mold tool is a galvanically produced mold tool which includes a locking bushing made from steel.

3. The method according to claim 1, wherein the sealing of the masked area is controlled via a pneumatic timer element disposed in the interior space of the mask and carried out prior to the start of the the first forming step.

4. The method according to claim 1, wherein the steps of depositing the mask, removing the mask and cleaning of the mask are carried out with the aid of a fully automated robot.

5. The method according to claim 1, wherein formation of the molded skins having different subregions is carried out by rotation sintering or spray sintering.

6. The method according to claim 1, wherein molding the skins having different subregions is carried out via a rotation sintering process utilizing a plastic material on the basis of at least one of: PVC and TPU in the form of a powder and depositing the plastic material by means of sequential melting at the surface of the molding tool.

* * * * *